United States Patent [19]

Huber et al.

[11] Patent Number: 5,416,360
[45] Date of Patent: May 16, 1995

[54] CIRCUIT CONFIGURATION FOR THE PASSENGER PROTECTION DEVICE OF A VEHICLE

[75] Inventors: Anton Huber, Regensburg; Dieter Neugebauer, Regenstauf, both of Germany

[73] Assignee: Siemens Aktiengesellschaft, Munich, Germany

[21] Appl. No.: 38,505

[22] Filed: Mar. 29, 1993

[30] Foreign Application Priority Data

Sep. 28, 1990 [DE] Germany .............. 40 30 823.5

[51] Int. Cl.$^6$ ................................ B60R 21/32
[52] U.S. Cl. ................... 307/10.1; 180/282; 280/735; 340/436
[58] Field of Search ............ 307/9.1, 10.1, 10.6; 340/669, 436, 438, 440; 280/735, 734, 728; 180/271, 274, 282; 324/727, 527; 73/510, 514, 518, 649, 652, 1 D, 1 DV

[56] References Cited

U.S. PATENT DOCUMENTS

| | | | |
|---|---|---|---|
| 3,774,714 | 11/1973 | Usui et al. | 280/735 |
| 3,859,482 | 1/1975 | Matsui et al. | 340/436 |
| 3,915,474 | 10/1975 | Held et al. | 280/734 |
| 3,931,527 | 1/1976 | Oishi et al. | 307/10.6 |
| 3,964,016 | 6/1976 | Yamada et al. | 340/436 |
| 4,060,004 | 11/1977 | Scholz et al. | 73/514 |
| 4,381,829 | 5/1983 | Montaron | 280/735 |
| 4,933,570 | 6/1990 | Swart et al. | 307/10.1 |
| 4,968,965 | 11/1990 | Naitou et al. | 280/735 |
| 5,037,129 | 8/1991 | Fritz et al. | 280/735 |
| 5,178,409 | 1/1993 | Hiramitsu et al. | 280/735 |
| 5,225,985 | 7/1993 | Okano | 280/735 |

FOREIGN PATENT DOCUMENTS

| | | |
|---|---|---|
| 0027747 | 4/1981 | European Pat. Off. . |
| 0305655 | 3/1989 | European Pat. Off. . |
| 2263845 | 7/1973 | Germany . |
| 2263250 | 6/1974 | Germany . |
| 2513023 | 10/1976 | Germany . |
| 89/05744 | 6/1989 | WIPO . |
| 92/03311 | 3/1992 | WIPO . |

OTHER PUBLICATIONS

International Search Report, PCT/DE91/00708.

*Primary Examiner*—A. D. Pellinen
*Assistant Examiner*—Richard T. Elms
*Attorney, Agent, or Firm*—Herbert L. Lerner; Laurence A. Greenberg

[57] ABSTRACT

A circuit configuration for a passenger protection device, such as an airbag, includes at least first and second collision sensors having triggering thresholds individually assigned thereto, for triggering a passenger protection device if the collision sensors exceed the triggering thresholds. The first sensor supplies an output signal exceeding the triggering threshold assigned to it before the second sensor issues an output signal exceeding the triggering threshold assigned to it, in the event of a collision. One of the sensors is a clock-generating sensor setting a beginning of a time period when its output signal exceeds a threshold value assigned to it, during the collision. One of the sensors mechanically actuates a switch and supplies an essentially binary output signal, in the event of a collision. Both of the sensors are required to exceed their triggering thresholds no later than a point in time within the time period, for the protection system to be finally triggered. The other of the sensors is an electronic sensor, such as a piezoresistive or a piezoelectric sensor, supplying an analog output signal, in the event of a collision. A programmable read-only memory PROM records a collision occurrence and stores data regarding a behavior of the output signals of at least one of the sensors occurring during the time period, at least if both of the sensors had exceeded their triggering thresholds during the point in time.

8 Claims, 1 Drawing Sheet

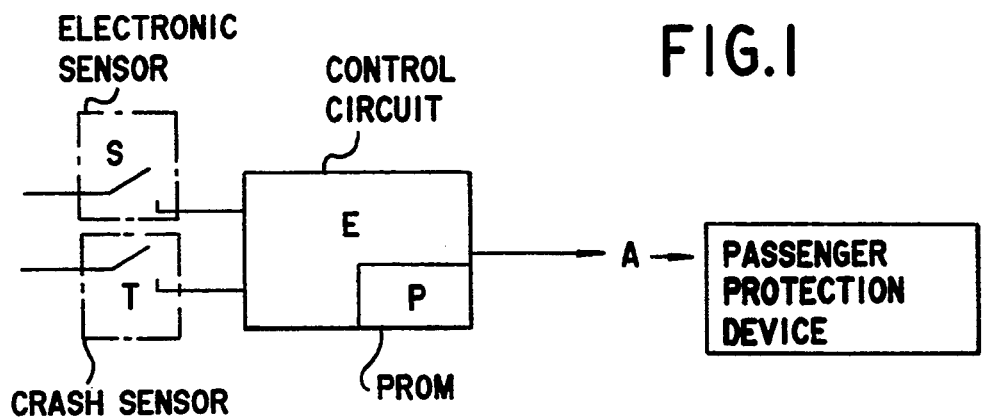
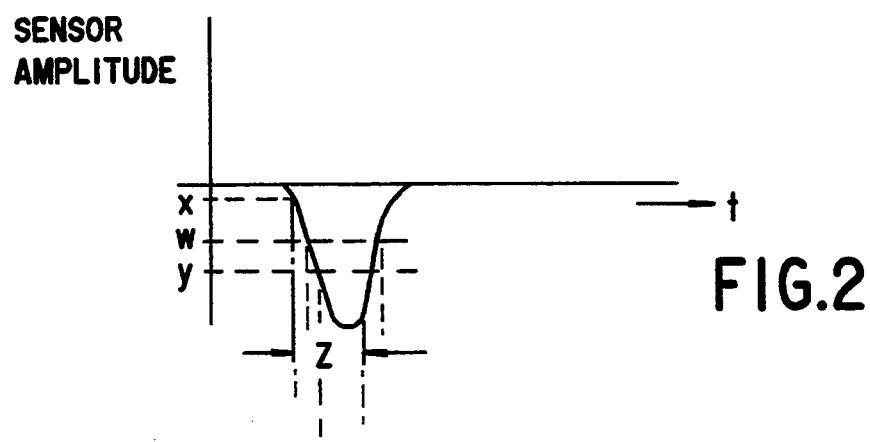
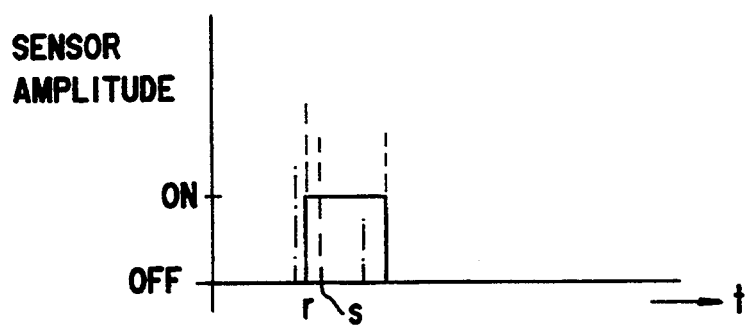

CIRCUIT CONFIGURATION FOR THE PASSENGER PROTECTION DEVICE OF A VEHICLE

CROSS-REFERENCE TO RELATED APPLICATION

This application is a Continuation of International Application Ser. No. PCT/DE91/00708, filed Sep. 6, 1991.

SPECIFICATION

The invention was developed first of all for an airbag system of a motor vehicle. However, it was found that in addition it can be used much more generally for other configurations as well. The invention is namely also suitable, for example, for rollover or roll bar and belt preloading systems, in addition, not only for motor vehicles, but also for other vehicles, such as for trucks and in principle even for aircraft.

The invention relates to a circuit for increasing the reliability of the passenger protection device of a vehicle and its subsequent checking. Mistaken triggerings of such devices are highly dangerous and should therefore be ruled out to the greatest extent. If, however, mistaken triggering really occurred, or if triggering is subsequently suspected to have been mistaken triggering, it should also be possible to adequately subsequently determine the cause of the proper or faulty triggering. The invention is intended to meet such quality requirements.

In a circuit configuration for a passenger protection device of a vehicle, for example an airbag system, the passenger protection device is triggered if at least two collision sensors exceed triggering thresholds individually assigned to them; in the event of a collision, the output signal of the first sensor, before the output signal of the other, second sensor, exceeds the triggering threshold respectively individually assigned to them; during the collision, one of the two sensors, known as a clock-generating sensor, sets the beginning of a time period when its output signal exceeds a threshold value assigned to it; one, for example the first, of the sensors mechanically actuates a switch and, in the event of a collision, supplies an essentially binary output signal; and at the latest at a point in time within this time period, both the first and the second sensor must have exceeded their triggering threshold, in order for the passenger protection system to be finally triggered.

The invention is based on the subject-matter defined above, which is known from U.S. Pat. No. 3,931,527. Through the use of two sensors, which only fire the device if both sensors detect crash-caused decelerations within a time window set by the first sensor, quite a high immunity to mistaken triggerings of the passenger protection system is already achieved.

Published European Application No. 0 027 747 A2, corresponding to U.S. Pat. No. 4,381,189, already discloses a circuit configuration for an airbag system, that is a passenger protection device of a vehicle, having a multiplicity of sensors. There, the sensors trigger the device if they exceed the triggering thresholds individually assigned to them. The circuit configuration additionally contains a programmable read-only memory (PROM) for recording data characterizing the collision.

In Published International Application WO 92/03311 a circuit configuration for the passenger protection device of a vehicle is described, in which a programmable read-only memory serves for recording a collision occurrence. There too, the passenger protection device is not triggered until at least two collision sensors exceed their triggering thresholds individually assigned to them.

A person skilled in the art is also familiar with the recording of data which register the function of controls of passenger protection systems during a collision from other documents. For example, German Published, Non-Prosecuted Application DE 22 63 845 discloses a circuit configuration for recording faulty operation of a passenger protection device by means of current pulse measurement (product of time and current intensity), in which the passenger protection device contains an airbag.

Sensors which can detect a collision have been described in a virtually incalculable number of publications. For example, German Published, Non-Prosecuted Application DE 25 13 023, corresponding to U.S. Pat. No. 4,060,004, discloses a sensor for detecting a collision which contains a movable mass, that experts often also refer to as a seismic mass.

Among other documents, German Published, Non-Prosecuted Application DE 22 63 250, corresponding to U.S. Pat. No. 3,915,474, discloses such a sensor detecting a collision and having a seismic mass, in which the position in which the mass is located precisely at the moment of collision, is stored in a memory.

It is accordingly an object of the invention to provide a circuit configuration for the passenger protection device of a vehicle, which overcomes the hereinafore-mentioned disadvantages of the heretofore-known devices of this general type, which uses a greatly differing construction of two sensors controlling the device to increase the reliability that the passenger protection system will be triggered only in the event of a collision and not just in the event of a different type of vibration of the vehicle, and which reliably logs the behavior of at least one of the two sensors detecting the collision in the time period concerned, that is relevant for triggering the passenger protection system, in such a way that essential conditions which led to triggering can be reconstructed at any time later after the collision.

With the foregoing and other objects in view there is provided, in accordance with the invention, a circuit configuration for a passenger protection device of a vehicle, for example an airbag system, comprising at least first and second collision sensors having triggering thresholds individually assigned thereto, for triggering a passenger protection device if the collision sensors exceed the triggering thresholds; the first sensor supplying an output signal exceeding the triggering threshold assigned to it before the second sensor issues an output signal exceeding the triggering threshold assigned to it, in the event of a collision; one of the sensors being a clock-generating sensor setting a beginning of a time period when its output signal exceeds a threshold value assigned to it, during the collision; one, for example the first, of the sensors mechanically actuating a switch and supplying an essentially binary output signal, in the event of a collision; both the first sensor and the second sensor being required to exceed their triggering thresholds no later than a point in time within the time period, for the passenger protection system to be finally triggered; the other, for example the second, of the sensors being an electronic piezoresistive or piezoelectric sensor supplying an analog output signal, in the event of a collision; a programmable read-only memory PROM for recording a collision occurrence; and the PROM storing data regarding a behavior of the output signals of at least one, if not additionally the other, of the sensors occurring during the time period, at least if both the first and the second sensors had exceeded their triggering thresholds during the point in time within the time period.

In accordance with another feature of the invention, the data stored in the PROM allow the behavior of at least one of the sensors to be ascertained with regard to both the point in time within the time period at which the sensor exceeded its triggering threshold, and the amplitude of the output signal of the sensor at other points in time within the time period. The advantage of such a feature is in being able to reconstruct the sequence of events of the collision and the triggering of the passenger protection system brought about by this sequence of events particularly accurately after the collision.

In accordance with a further feature of the invention, the threshold value of the clock-generating sensor is identical to its triggering threshold, whereby the clock-generating sensor exceeds its triggering threshold at the beginning of the time period set by it, in the event of a collision. Such a device requires particularly little expenditure because there is no need for a threshold value which is distinct from a triggering threshold.

In accordance with a concomitant feature of the invention, the threshold value of the clock-generating sensor is smaller than its triggering threshold, whereby the output signal of the clock-generating sensor exceeds its threshold value before reaching its triggering threshold, in the event of a collision. It is therefore possible to not only log the behavior of the second sensor, in particular when it exceeds its own triggering threshold during the collision. If the logging of the data in the PROM already begins with the beginning of the time period and the threshold value of the clock-generating sensor is chosen low enough, even the behavior of the first sensor can also be logged, in fact even beginning before this first sensor reached its own triggering threshold.

Other features which are considered as characteristic for the invention are set forth in the appended claims.

Although the invention is illustrated and described herein as embodied in a circuit configuration for the passenger protection device of a vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 1 is a schematic and block diagram illustrating a concept for the construction of the circuit configuration according to the invention;

FIG. 2 is a time-amplitude diagram showing an example of a variation of an output signal of a second sensor occurring in the event of a collision, wherein the sensor then emits an analog signal; and FIG. 3 is a time-amplitude diagram showing an example of a variation of an output signal of a first sensor occurring in the event of a collision, wherein the sensor then emits a binary signal.

Referring now in detail to the figures of the drawing, in which illustrative embodiments have been represented as simply as possible for the sake of clarity, and first, particularly, to FIG. 1 thereof, there is seen a circuit configuration according to the invention which serves for recording important data in a programmable read-only memory P, which is also known by experts as a PROM for short, if the vehicle is involved in a collision. FIG. 1 thus shows an example of such a circuit configuration, which in this case contains two sensors S and T as well as a control circuit E. The PROM P is fitted in the control circuit E. The circuit configuration is to be fitted in a vehicle which has a passenger protection device, for example one or more airbags and/or belt preloading devices and/or roll or rollover bars.

In the event of a collision, this circuit configuration emits a control pulse A at its output, which triggers the passenger protection system. Whether or not the circuit configuration emits a control pulse A depends on whether or not, during the collision, at least two sensors, such as the sensors S and T, in good time exceed triggering thresholds individually assigned to them, such as thresholds y and w in FIGS. 2 and 3.

The terms "first" and "second" in connection with the sensors S, T are always defined herein in such a way that, during a collision, the output signal of the first sensor, which is the sensor T herein, exceeds the triggering threshold individually assigned to it, before the output signal of the second sensor S exceeds the triggering threshold individually assigned to it, that is the triggering threshold y for the second sensor and the triggering threshold w for the first sensor seen in FIGS. 2 and 3.

In the case of the invention, one of the two sensors, which according to FIG. 2 is the second sensor T and is known as the clock-generating sensor, starts the beginning of a time period Z when its output signal exceeds a threshold value x assigned to it. At the latest at a point in time within this time period Z, both the first sensor, for example the sensor S, and the second sensor, which in that case is the sensor T, must have exceeded their respective triggering thresholds y and w in order for the passenger protection system A to be finally triggered. It may even be permitted for at least one of these sensors, for example the sensor T, to exceed its individual triggering threshold even before or at the beginning of the time period Z.

Collision-relevant data regarding the behavior of at least one of the two sensors S, T, which is generally regarding the behavior of both sensors S, T, are stored in the PROM P. In fact the data is regarding their behavior at least during the time period Z set by the clock-generating sensor. Storing data (at least about one of the two sensors) in the PROM P is envisaged, according to the invention, at least whenever both sensors had exceeded their triggering threshold y, w at a point in time within this time period Z, so that the passenger protection system would have to be finally triggered.

As a result, according to the invention, the behavior of the sensors can be reliably logged in the time period concerned, which is relevant for triggering the passenger protection system, in such a way that the most important conditions prevailing upon triggering can be reconstructed at any time later after the collision. For this purpose, data regarding the behavior of the output signals at least of one of the two, if not additionally of the other of the two, sensors S, T occurring during the time period Z, are stored in the PROM P whenever the sensor, or the two sensors concerned, exceeded its/their triggering threshold y or w. As a result, the behavior of the sensors S, T in the time period Z concerned, which is relevant for triggering the passenger protection system, is logged in such a way that their behavior, and similarly the sequence of events of the collision itself, can be adequately reconstructed at any time later after the collision.

In order to make do with particularly little expenditure, in particular by dispensing with a threshold value which is distinct from a triggering threshold, in contrast to that shown in FIG. 2, the threshold value x of the clock-generating sensor may be made identical to its triggering threshold, that is w, so that in the event of a collision, the clock-generating sensor exceeds its triggering threshold precisely at the beginning of the time period Z that is set by it.

In order to be able to reliably log not only the behavior of the second sensor, in particular when it exceeds its own triggering threshold, but then also the behavior of the first sensor, during the collision, the threshold value of the clock-generating sensor, that is x in FIG. 2, even of the second sensor T herein by way of example, may be made smaller than its triggering threshold, that is y and w, so that in the event of a collision, the output signal of the clock-generating sensor still exceeds its threshold value x clearly, before reaching its triggering threshold y.

In order to use the greatly differing construction of the sensors concerned to achieve a high degree of reliability that the passenger protection system is really triggered only in the event of a collision, and not just in the event of a different type of vibration of the vehicle, a sensor may be chosen for one sensor, which is the first sensor S in the example given herein, that mechanically activates a switch and, in the event of a collision, supplies more or less a binary output signal, that is OFF-/ON in FIG. 3, and thus then switches a current or a voltage ON or OFF. In the case of the other sensor, which is then the second sensor T, there may be chosen an electronic sensor, namely a piezoresistive or piezoelectric sensor, for example, which supplies an analog output signal in the event of a collision.

In order to be able to particularly accurately reconstruct the sequence of events of the collision and the triggering of the passenger protection system brought about by this sequence of events after the collision, it is possible to store data in the PROM P regarding the behavior of at least one of the two sensors S, T in such a way that later, after the collision, it can be ascertained from them both at what point in time, that is s and r, respectively, this sensor S and/or T exceeded its triggering threshold y and w, respectively, and the amplitude, in FIG. 2 or ON in FIG. 3, of the output signal of this sensor S or T at further, other points in time within the time period Z.

We claim:

1. A circuit configuration for a passenger protection device of a vehicle, comprising:
    at least first and second collision sensors having triggering thresholds individually assigned thereto, for triggering a passenger protection device if said collision sensors exceed the triggering thresholds;
    said first sensor supplying an output signal exceeding the triggering threshold assigned to it before said second sensor issues an output signal exceeding the triggering threshold assigned to it, in the event of a collision;
    one of said sensors being a clock-generating sensor setting a beginning of a time period when its output signal exceeds a threshold value assigned to it, during the collision;
    one of said sensors mechanically actuating a switch and supplying an essentially binary output signal, in the event of a collision;
    both said first sensor and said second sensor being required to exceed their triggering thresholds no later than a point in time within the time period, for the passenger protection device to be finally triggered;
    the other of said sensors being an electronic sensor supplying an analog output signal, in the event of a collision;
    a programmable read-only memory PROM for recording a collision occurrence; and
    said PROM storing data regarding a behavior of the output signals of at least one of said sensors occurring during the time period, at least if both said first and said second sensors had exceeded their triggering thresholds during the point in time within the time period,
    wherein the data stored in said PROM allow the behavior of at least one of said sensors to be ascertained with regard to the point in time within the time period at which said sensor exceeded its triggering threshold.

2. The circuit configuration according to claim 1, wherein said one sensor mechanically actuating a switch is said first sensor.

3. The circuit configuration according to claim 1, wherein said other electronic sensor is said second sensor.

4. The circuit configuration according to claim 3, wherein said second electronic sensor is a piezoresistive sensor.

5. The circuit configuration according to claim 3, wherein said second electronic sensor is a piezoelectric sensor.

6. The circuit configuration according to claim 1, wherein the data stored in said PROM further allow the behavior of the at least one of said sensors to be ascertained with regard to:
    the amplitude of the output signal of said sensor at other points in time within the time period.

7. The circuit configuration according to claim 1, wherein the threshold value of said clock-generating sensor is identical to its triggering threshold, whereby said clock-generating sensor exceeds its triggering threshold at the beginning of the time period set by it, in the event of a collision.

8. The circuit configuration according to claim 1, wherein the threshold value of said clock-generating sensor is smaller than its triggering threshold, whereby the output signal of said clock-generating sensor exceeds its threshold value before reaching its triggering threshold, in the event of a collision.

* * * * *